Figure 1:
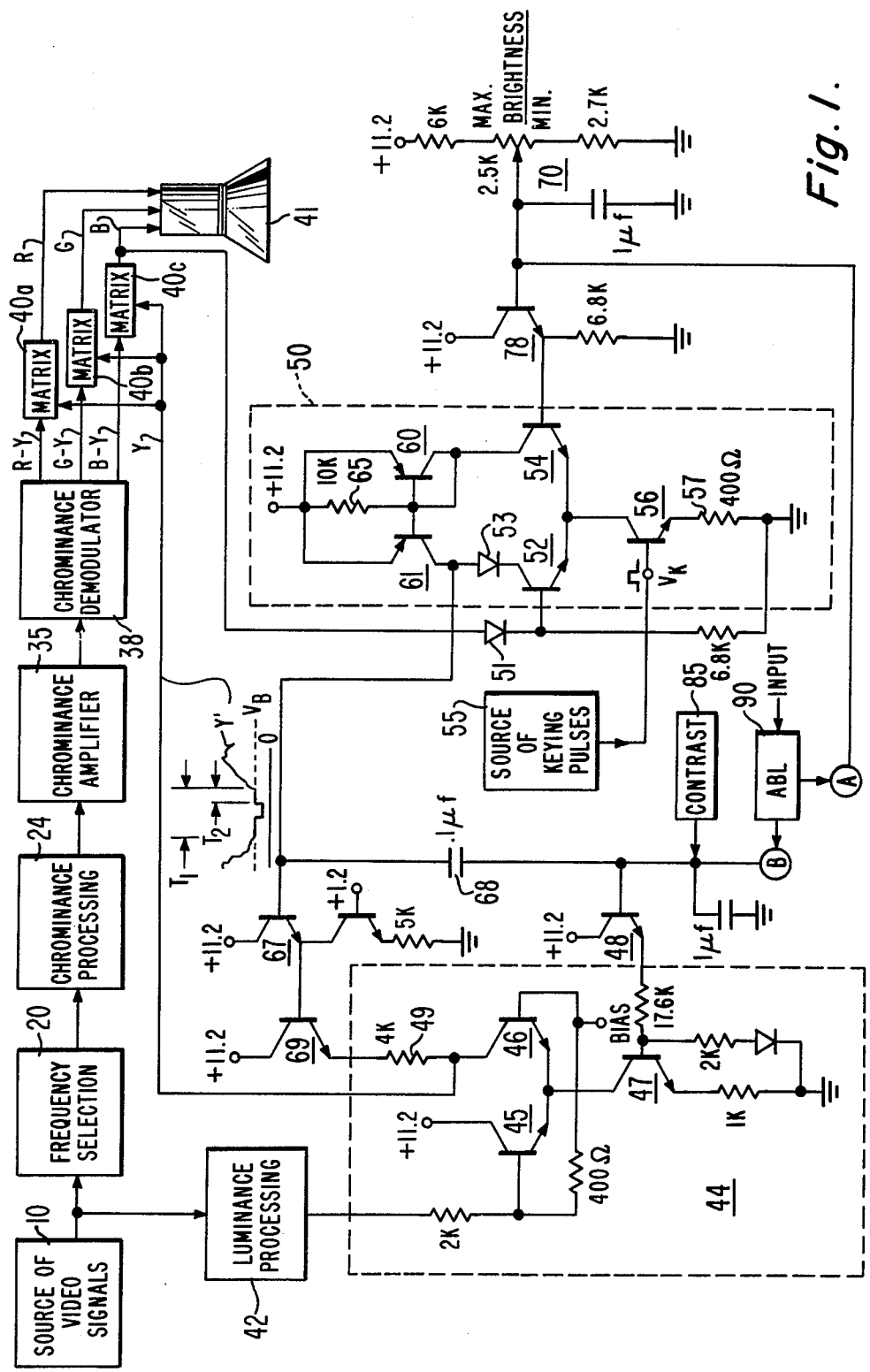

United States Patent [19]

Harwood

[11] 4,209,808
[45] Jun. 24, 1980

[54] STABILIZED AUTOMATIC BRIGHTNESS CONTROL NETWORK IN A VIDEO SIGNAL PROCESSING SYSTEM INCLUDING AN AUTOMATIC KINESCOPE BEAM CURRENT LIMITER

[75] Inventor: Leopold A. Harwood, Bridgewater, N.J.

[73] Assignee: RCA Corporation, New York, N.Y.

[21] Appl. No.: 23,964

[22] Filed: Mar. 26, 1979

[51] Int. Cl.$^2$ .............................................. H04N 5/68
[52] U.S. Cl. ..................................... 358/243; 358/74; 358/39; 358/168
[58] Field of Search ..................... 358/39, 74, 168, 243

[56] References Cited
U.S. PATENT DOCUMENTS

| 3,873,767 | 3/1975 | Okada | 358/243 |
| 4,096,518 | 6/1978 | Tuma | 358/243 |
| 4,121,252 | 10/1978 | Saiki | 358/243 |
| 4,126,884 | 10/1978 | Shanley | 358/243 |
| 4,137,552 | 1/1979 | Serafini | 358/243 |
| 4,167,025 | 9/1979 | Willis | 358/243 |

Primary Examiner—John C. Martin
Assistant Examiner—Michael A. Masinick

Attorney, Agent, or Firm—Eugene M. Whitacre; William H. Meagher; Ronald H. Kurdyla

[57] ABSTRACT

A video signal processing system is disclosed including a sample and hold comparator arranged in a closed control loop with a video channel including a video amplifier for the purpose of providing automatic brightness control, and an automatic kinescope beam current limiter. The beam current limiter is coupled to a first point in the amplifier for controlling the amplifier signal gain to limit excessive beam current demand in a first control mode. In a second control mode, the beam current limiter cooperates with the automatic brightness control network to control the D.C. output level of the video amplifier in the presence of excessive beam current demand. The comparator response time is slow relative to transient variations of the D.C. level at the amplifier output induced by beam limiter action in the first control mode, but is otherwise sufficient to permit compensation of relatively long term variations in the output D.C. level. Compensation of the transient D.C. variations is provided by coupling transient beam limiter control voltages developed in the first control mode to a second point in the amplifier, for opposing transient D.C. level variations which would otherwise appear at the amplifier output in response to beam limiter action.

6 Claims, 3 Drawing Figures

STABILIZED AUTOMATIC BRIGHTNESS CONTROL NETWORK IN A VIDEO SIGNAL PROCESSING SYSTEM INCLUDING AN AUTOMATIC KINESCOPE BEAM CURRENT LIMITER

This invention relates to a video signal processing system including an automatic beam current limiter (ABL) network for automatically limiting excessive kinescope current conduction, and an arrangement to compensate for undesired D.C. level shifts caused when the video signal amplitude is varied by the ABL network in a direction to limit excessive kinescope beam current conduction.

A television receiver or equivalent video signal processing system sometimes includes provision for automatically limiting excessive kinescope conduction by controlling the peak-to-peak amplitude of the television signal in a direction to reduce or limit excessive beam currents in response to an ABL control signal. Arrangements of this type are described in U.S. Pat. No. 3,873,676 (Okada, et al.), U.S. Pat. No. 4,126,884 (Shanley), and U.S. Pat. No. 4,096,518 (Tuma, et al.). The ABL control signal utilized in this manner in some instances also causes an unwanted, significant shift in the D.C. level of the video signal. The D.C. level shifts can be troublesome and preferably should be avoided or compensated for, such as in systems employing an automatic brightness control arrangement of the type described in a copending U.S. patent application Ser. No. 794,128 of A. V. Tuma, et al., entitled "Brightness Control Circuit Employing A Closed Control Loop." In that system, a keyed comparator and a comparator output filter capacitor are arranged as a sample and hold circuit in a closed control loop with a video signal channel. A filtered comparator output signal is utilized to adjust the D.C. level of the video signal so that it substantially equals a brightness representative reference voltage. The value of the filter capacitor is chosen so that the automatic brightness control arrangement exhibits an acceptable response time and noise immune operation.

The unwanted shift in the D.C. level of the video signal is particularly troublesome when the beam limiter is caused to operate in response to a rapid or transient increase in excessive beam current demand, due to repetitive or non-repetitive video signal conditions. Some examples of repetitive signal conditions of this type include a video signal representative of a bright image area surrounded by a dark image area which repeats for several scanning fields, or complex image patterns consisting of alternating black-to-white image areas such as may be produced by a video signal associated with a video games system. Non-repetitive rapid increases in excessive beam current demand can be produced by any rapid dark to bright image transition such as can be experienced when changing channels, when a dark scene is followed immediately by a much brighter scene, or when rapid, extreme readjustments of the receiver brightness or contrast controls are made by a viewer.

When these conditions occur, the automatic brightness control sample and hold network may be unable to compensate quickly for the D.C. level variations of the video signal which accompany the video signal amplitude variations as developed in response to the ABL control signal, if the response time of the sample and hold network is slow relative to the rate of change of the D.C. level variations. That is, the filtered comparator output will be of insufficient magnitude to correct for the D.C. variations.

The inability of the automatic brightness control network to provide D.C. correction under these conditions can have a pronounced, adverse effect on a displayed image, particularly when the uncompensated, D.C. variations are in a direction opposite to the direction of the controlled peak signal amplitude, since such D.C. variations are in a direction for increasing image brightness and thereby kinescope beam current demand. This increased beam current demand represents an additional load on the power supply circuit which supplies the kinescope. In many instances, the kinescope supply voltages (e.g., the high voltage supply) and supply voltages associated with other portions of the receiver (e.g., signal processing and deflection circuits) are derived from a common power supply such as the horizontal output transformer. Even if the common power supply is regulated, an unstable condition can occur if the power supply is called upon to deliver current in excess of its design limit, such as in response to the additional excessive beam current demand. One visible manifestation of this condition is a fluctuating (unstable) image brightness level due to fluctuating D.C. supply voltages derived from the power supply. Under more severe conditions, (e.g., if the brightness were set high to begin with), the operation of the image synchronizing circuits could be affected such that image stability is lost (e.g., vertical and horizontal sync would be impaired).

A fluctuating image brightness level can also be produced when the video signal D.C. level variations caused by beam limiter action are in the same direction as the direction of the controlled peak signal amplitude. In this case, image brightness will fluctuate between a normal brightness level and a level of reduced brightness.

The D.C. level shifts and the attendant undesirable effects noted above can be significantly reduced or eliminated by increasing the response time of the comparator output, such as by reducing the size of the comparator filter capacitor. This is not an optimum solution, however, since a small filter capacitor detracts from the noise immunity of the automatic brightness control network. In accordance with the principles of the present invention, it is recognized as desirable to arrange the automatic brightness control network including the comparator and the associated circuits such that unwanted, D.C. level shifts of the video signal produced in response to beam limiter action are compensated for in a manner which does not compromise the effectiveness (e.g., noise immunity) of the automatic brightness control network.

Apparatus in accordance with the principles of the present invention is included in a video signal processing system comprising a video signal processing channel, a source of brightness reference voltage, a kinescope for reproducing images in response to the video signals, and a gain controllable video signal amplifier included in the video channel. The video signal contains periodically recurring image intervals, and blanking intervals disposed between adjacent image intervals and containing a blanking level determinative of image brightness. A comparator compares the reference voltage and the blanking level to produce an output signal indicative of the difference between the reference voltage and blanking level. The comparator output signal is filtered and coupled to the video channel for varying the blanking level in a direction to reduce the magnitude of the difference. The system also includes a network for deriving a control signal representative of excessive kinescope beam current demand. The derived control signal is coupled to a first point in the amplifier for varying the gain thereof and thereby the peak amplitude of the video signal in a direction to limit the kinescope current demand. Transient variations of the derived control signal are applied via a signal coupling network to a second point in the amplifier, for opposing transient variations of the D.C. output level of the amplifier otherwise produced as the amplifier gain is varied in response to transient variations of the derived control signal.

Figure 2:
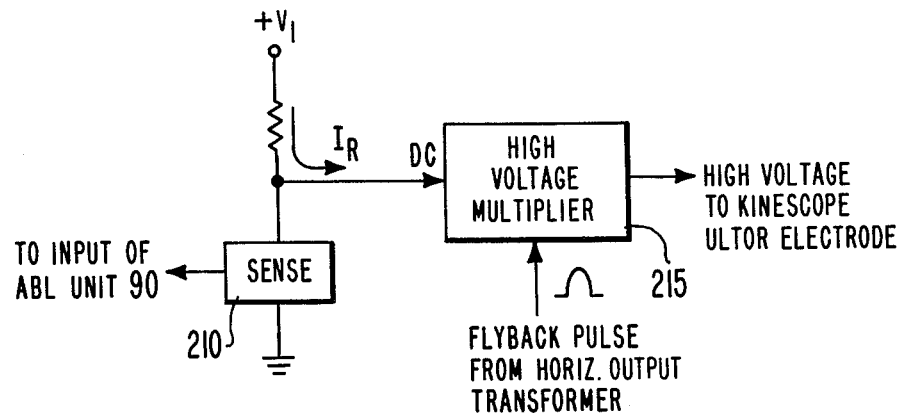
Figure 3:
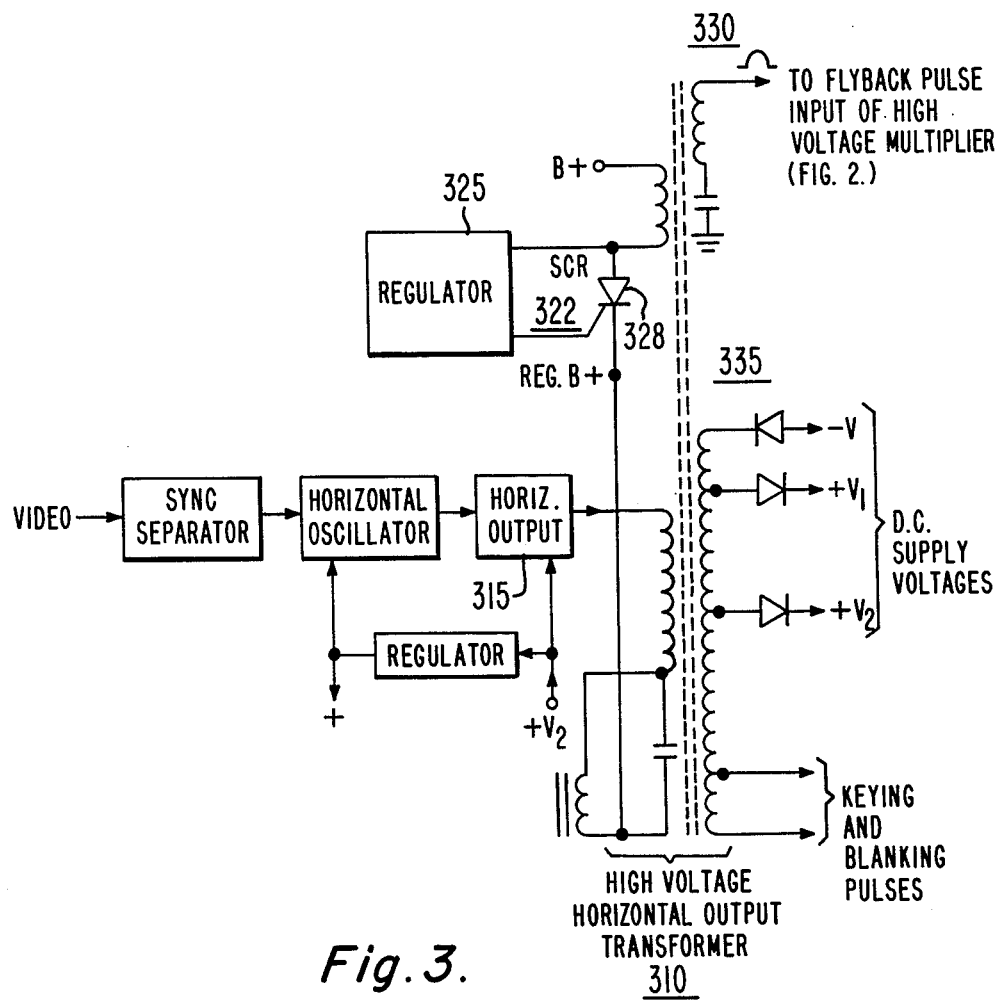

FIG. 1 is a diagram partially in block form and partially in schematic circuit diagram form of a portion of a color television receiver employing apparatus constructed in accordance with the present invention; and FIGS. 2 and 3 illustrate other portions of the receiver useful in understanding the operation of the apparatus according to the invention.

In FIG. 1, a source of video signals 10 provides detected composite video signals comprising luminance and chrominance signal components. The chrominance component is coupled via a frequency selection unit 20 to a chrominance signal processing unit 24 in a chrominance channel of the receiver. Chrominance processing unit 24 may, for example, including signal amplification as well as automatic color control (ACC) and automatic frequency and phase control (AFPC) stages. Processed signals from unit 24 are further amplified by a chrominance amplifier 35 and are supplied to a chrominance demodulator 38 for deriving R-Y, B-Y and G-Y color difference signals. The color difference signals are each combined with a luminance signal Y in matrix networks 40a, 40b and 40c, respectively, to produce R, G and B color representative signals. These signals are then coupled to a kinescope 41 via suitable kinescope driver stage (not shown).

A luminance signal processing unit 42 in a luminance channel of the receiver preamplifies and otherwise processes the luminance component of the composite video signal from source 10. The processed luminance component is supplied to a luminance amplifier 44 comprising a pair of differentially connected transistors 45–46, and a current source including a transistor 47 for supplying operating currents to transistors 45 and 46. A load circuit for amplifier 44 comprises a common collector bias transistor 69 and a load resistor 49 arranged in a collector circuit of transistor 46. An amplified luminance signal (Y) appears at a collector electrode of transistor 46 and is coupled to each of similar matrix networks 40a, 40b and 40c.

Luminance signal Y at the collector output of transistor 46 contains a periodically recurring horizontal line retrace interval $T_1$ disposed between adjacent horizontal line image trace intervals containing luminance image information Y'. The blanking interval comprises a negative-going line synchronizing pulse and a blanking level $V_B$ (i.e., a brightness reference level). Blanking level $V_B$ does not vary with image information and approximates a black level of the luminance signal. However, variations of the blanking level produce corresponding variations of image brightness.

In the case of a composite color television signal, a portion of a so-called "back-porch" time interval ($T_2$) of the composite video signal contains several cycles of a color subcarrier reference signal (i.e., a color burst reference signal) of a frequency of approximately 3.58 MHz according to United States television standards. The burst signal is removed from the luminance signal by a preceding 3.58 MHz trap (not shown), so that interval $T_2$ contains only the brightness reference blanking level.

Image contrast is adjusted by means of a contrast control unit 85 (e.g., a viewer adjustable potentiometer). Adjustment of contrast control 85 varies the current conduction of current source transistor 47 via an emitter follower transistor 48, and thereby the gain of amplifier 44 and the peak-to-peak amplitude of the luminance signal appearing at the collector of transistor 46.

Image brightness is manually adjustable by means of a network including a brightness control potentiometer 70 and an associated source of positive D.C. potential (+11.2 volts). Increasing or decreasing brightness is provided by adjusting a wiper of potentiometer 70 between extreme upper (MAX) and lower (MIN) positions, which serves to correspondingly change the base and emitter voltage of a follower transistor 78. The emitter voltage of transistor 78 represents a brightness reference voltage developed in accordance with the setting of brightness control 70, and is coupled to an input of a high gain, keyed differential comparator circuit 50 arranged in a "sample and hold" configuration.

Comparator 50 includes emitter coupled sampling transistors 52 and 54 arranged as a differential amplifier. Operating currents for transistors 52 and 54 are supplied via a keyed current source transistor 56 and a resistor 57. An active load network for transistors 52, 54 includes a current mirror arrangement comprising a transistor 61, a diode-connected transistor 60, and a resistor 65, all arranged as shown.

The translated brightness reference voltage from potentiometer 70 is coupled to a base input of sampling transistor 54, and the blue (B) signal output of matrix network 40c is coupled to a base input of sampling transistor 52 via a diode 51. A collector output of transistor 52 is coupled to one end of an average responding charge storage capacitor 68, the other end of which is coupled in common to the junction of the base of transistor 48, the output of contrast control 85, and a terminal B at one output of an automatic beam current limiting (ABL) network 90. A diode 53 poled to conduct forward current in the same direction as the collector-emitter current of transistor 52 is coupled between capacitor 68 and the collector output of transistor 52, as discussed in U.S. Pat. No. 4,143,398 (Harwood, et al.). A voltage developed on capacitor 68 from the output of comparator 50 is coupled to amplifier 44 via a follower transistor 67 and transistor 69, and serves to control the blanking level and thereby the brightness determinative D.C. level of luminance signal Y appearing at the collector of transistor 46 of luminance amplifier 44, as will be discussed.

Automatic beam current limiter 90 may include control circuits of the type disclosed in aforementioned U.S. Pat. No. 4,096,518, for providing sequential control of the video signal D.C. level (image brightness) and peak amplitude (image contrast) over different ranges of excessive beam current. An input of unit 90 receives a signal representative of excessive kinescope beam current demand as derived by a sensing circuit as shown in FIG. 2. In FIG. 2, the beam current representative signal is derived by sensing unit 210 which monitors the level of kinescope resupply current ($I_R$) flowing into a D.C. input of a high voltage multiplier 215, which provides a high operating voltage and current for the ultor electrode of kinescope 41. Sensing unit 210 may be of the type described in U.S. Pat. No. 4,167,025 of D. H. Willis, entitled "Automatic Peak Beam Current Limiter."

In this example, ABL unit 90 is arranged so that a negative-going control voltage developed at output terminal B of ABL unit 90 when beam current demand exceeds a threshold level within a first range is applied via transistor 48 to current source transistor 47 of amplifier 44, for varying the peak amplitude of the video signal processed by amplifier 44 in a direction to limit beam current demand. A negative-going control voltage developed at output terminal A of unit 90 when beam current demand exceeds the threshold level within a second range of currents, greater than the first range, is coupled to the base of comparator transistor 54 via transistor 78 and serves to modify the brightness representative reference voltage applied to comparator input transistor 54. This control voltage together with the operation of comparator 70 serves to vary the D.C. level of the luminance signal and thereby image brightness in a direction to limit beam current demand above the threshold level. The control voltage at terminal B is clamped to a fixed level at this time.

The blanking level of the luminance signal and hence the brightness of a reproduced image are controlled in response to the voltage developed on capacitor 68, as described in detail in the aforementioned copending U.S. patent application of A. V. Tuma, et al., Ser. No. 794,128. Briefly, comparator 50, luminance amplifier 44 and matrix 40c form a closed control loop (i.e., a servo loop) for maintaining a substantially fixed relationship between the D.C. voltage setting of potentiometer 70 (representing a desired brightness or blanking level of a reproduced image), and the brightness determining blanking level of the signal (B) applied to kinescope 41 from matrix 40c. Comparator 50 and capacitor 68 are arranged as a "sample and hold" network. "Sampling" occurs during the burst interval of time $T_2$, and "holding" occurs during the remainder of each horizontal line cycle.

Current source transistor 56 of comparator 50 and consequently sampling transistors 52 and 54 are keyed "on" (i.e., rendered conductive) during the sampling period in response to positive periodic keying pulses $V_K$ applied to the base of transistor 56 during burst interval $T_2$. The periodic keying pulses are supplied from a source of keying pulses 55, which can be of the type described in U.S. Pat. No. 4,051,518. Since time $T_2$ corresponds to a portion of the blanking (image retrace) time during which luminance and chrominance image information are not present in the video signal, the video output signal from matrix 40c coupled to the base of transistor 52 contains only the blanking level component at this time.

Under static brightness control conditions for a given setting of potentiometer 70 and a given time when transistor 56 is keyed "on", comparator 50 compares the voltage then appearing at the base of transistor 54 (corresponding to a desired brightness level in accordance with the setting of potentiometer 70), with the voltage then appearing at the base of transistor 52 (corresponding to the brightness representative blanking level of the signal then appearing at the output of matrix network 40c). The voltage between the base electrodes of comparator transistors 52 and 54 can differ due to readjustment of the setting of potentiometer 70, or to a shift of the blanking level of signal B due to temperature changes or otherwise. If a difference exists between these voltages, by differential action comparator 50 generates a control voltage at the collector of transistor 52, and hence on capacitor 68 and at the base of transistor 69, of a magnitude and direction to reduce the imbalance toward zero such that the difference between the base voltages of transistors 52 and 54 approaches zero (i.e., zero error).

Illustratively, if the base voltage of transistor 52 is caused to increase relative to the base voltage of transistor 54, the collector current and voltage of transistor 52 increase and decrease, respectively, relative to the collector current and voltage of transistor 54 by virtue of the differential action of comparator 50 during the keying interval of time $T_2$. The increased collector voltage of transistor 54 biases PNP transistor 61 for reduced current conduction, and a charge otherwise appearing across capacitor 68 is depleted (discharged) via the collector-emitter current path of transistor 52 in accordance with the level of conduction of transistor 52. The reduction in voltage on capacitor 68 is translated without inversion via transistors 67 and 69 and resistor 49 to the collector of transistor 46, causing the blanking level of luminance signal Y at the collector of transistor 46 to also decrease a corresponding amount. This reduction of the blanking level is in a direction to reduce the potential difference between the base electrode of comparator transistors 52, 54 toward zero, corresponding to the desired relationship.

The signal gain of amplifier 44 is decreased when beam limiter 90 produces an output control voltage at terminal B. Specifically, the negative-going control signal from terminal B of unit 90 is translated via follower transistor 48 without inversion to the base of current source transistor 47. This control signal is in a direction to reduce the current conduction of transistor 47 and thereby the signal gain of amplifier 44 by an amount proportional to the magnitude of the control signal. This reduction in amplifier gain reduces the peak-to-peak amplitude of the luninance signal appearing at the collector output of transistor 46 so as to limit the beam current conduction of kinescope 41.

It is noted that although the amplitude of the luminance signal is decreased in a direction for limiting beam current demand, the D.C. level developed at the collector of transistor 46 tends to increase in the opposite direction (i.e., in a direction to increase image brightness and therefore beam current demand). This occurs since the reduced gain and current conduction of transistor 46 produces a smaller D.C. voltage drop across load resistor 49, thereby increasing the D.C. collector voltage of transistor 46.

Certain transient signal conditions, examples of which were mentioned earlier, can cause transient excessive beam current demand on a repetitive or non-repetitive basis. Corresponding transient control signals developed at output terminal B of ABL unit 90 in response to these signal conditions serve to reduce the signal gain of amplifier 44 in a direction to limit the beam current demand. At the same time, however, the quiescent collector voltage of amplifier transistor 46 increases and varies with the rate of variation of the ABL control signal, since an increased collector voltage of transistor 46 is associated with a reduction in current conduction and signal gain of transistor 46. This increase in the collector voltage of transistor 46 is undesirable since it opposes the beam current limiting effect associated with reducing the gain of amplifier 44, and may also disrupt the receiver power supply circuits such that the image display is also disrupted. Reference is made to FIG. 3 with regard to the latter effect.

FIG. 3 illustrates a television receiver power supply arrangement derived from the horizontal output transformer, which is appropriate for present purposes. Additional details of a power supply of this type may be found in the "CTC-85 Color Chassis Technical Manual" available from RCA Corporation, Consumer Electronics Division, Indianapolis, Ind. In FIG. 3, the primary winding of a horizontal output transformer 310 is supplied from the output of a horizontal output stage 315 of conventional configuration. Also associated with transformer 310 is a voltage regulator network 322 including a regulator unit 325 and an SCR switching device 328, for providing a regulated voltage (REG. B+) at the primary winding. Transformer 310 represents a common power supply from the secondary winding of which is provided a plurality of receiver supply voltages. Specifically, an upper secondary winding 330 supplies high voltage horizontal flyback pulses to the high voltage multiplier (FIG. 2), and a plurality of D.C. supply voltages as well as flyback keying and blanking pulses are derived from taps on a lower secondary winding 335.

The regulation of this power supply network can be upset if called upon to deliver power in excess of its design limit, such as might be produced by a transient condition which causes the kinescope to demand excessive current (i.e., as manifested by excessive resupply current $I_R$ in FIG. 2). This condition can be caused by rapid video signal D.C. level variations induced by the ABL action, as discussed previously, since these (oppositely directed) variations are in a direction to increase image brightness and therefore beam current demand.

Excessive current demand associated with any one or more of the D.C. supply voltages derived from the power supply network including transformer 310 can upset the regulation of this network. This is most likely to occur during the beam current limiting mode, when beam current demand (i.e., resupply current $I_R$ supplied to the kinescope via voltage multiplier 215) is excessive. This current demand loads the voltage supply $+V_1$ which is associated with the source of resupply current (FIG. 2) and which is derived from transformer 310 (FIG. 3). Specifically, regulator 322 may exhibit an unstable condition if momentarily called upon to provide very high current levels such as may be caused by the additional transient increases in D.C. level induced by ABL action when beam current demand is already high. With such a transient condition, normal regulator operation can be upset such that the regulator might be caused to operate in a relaxation oscillation mode and lose regulation (e.g., the switching operation of SCR 328 might be disrupted, even to the point of being prevented from turning "off"). When this occurs, the derived D.C. supply voltages would fluctuate undesirably. These fluctuations are manifested in a displayed image as brightness fluctuations and, under severe conditions, as a loss in image stability due to loss of image sync in response to impaired operation of the vertical and horizontal deflection circuits as a consequence of the supply voltage variations. The repetition rate of these fluctuations is a function of several factors, such as the nature of switching regulator 322, circuit time constants (e.g., the time constants associated with the comparator filter capacitor and the filter capacitors associated with the brightness and contrast controls), as well as the gains of the circuits associated with these time constants. Since keying and blanking pulses derived from transformer 310 are also affected by the disrupted operation of regulator 322, the timing of various signal processing circuits is also affected.

The image brightness can also be caused to fluctuate when the video signal D.C. level variations caused by ABL action are in the same direction as the direction of the controlled peak amplitude of the video signal. In this case (not illustrated), image brightness will fluctuate perceptibly between a normal brightness level and a level of reduced brightness, even if the power supply network including regulator 322 and transformer 310 operate normally. The repetition rate of these variations is a function of the circuit time constants mentioned above, as well as the gains of the circuits associated with these time constants.

The unwanted D.C. voltage variations are substantially nullified as a result of the connection of the lower terminal of filter capacitor 68 to output terminal B of ABL unit 90 (FIG. 1). This connection permits transient ABL control signals from unit 90 to be coupled through capacitor 68 and to the collector output of transistor 46 via transistors 67, 69 and resistor 49. Since the transient ABL control signals coupled via capacitor 68 are in a negative-going direction, and the corresponding D.C. voltage variations induced at the collector of transistor 46 in response to the (gain control) ABL signals are in a positive direction, the net collector voltage change of transistor 46 is substantially zero due to voltage cancellation.

If this or an equivalent voltage compensating connection were not provided (e.g., if the lower terminal of capacitor 68 were connected to ground instead of as shown), significant variations of the D.C. output level of amplifier 44 induced by ABL peak amplitude control action may not be properly compensated for by the automatic brightness control network including comparator 50. The automatic brightness network would attempt to compensate, but may be unable to do so when D.C. voltage variations of significant magnitude induced by ABL action occur at a rate faster than the response time of the brightness control network. In this regard, it is noted that the response time of the automatic brightness control network is a function of the size of comparator filter capacitor 68, as well as the current conduction capability of comparator 50 for charging and discharging capacitor 68.

The inability of the brightness control network to compensate for the ABL induced variations in the D.C. output level of amplifier 44 results in additional excessive loading of the regulated power supply (FIG. 3), which can be great enough to cause the unwanted effects mentioned previously. These effects are prevented from occurring, however, by applying the transient ABL control signal to gain controlled amplifier 44 in the described (or equivalent) manner to nullify the undesired D.C. level shifts induced by the ABL gain control action. With this arrangement, the size of comparator storage capacitor 68 need not be reduced in order to increase the response time of the comparator. Accordingly, the desired noise immunity of the automatic brightness control network is preserved.

What is claimed is:

1. In a video signal processing system including a video signal channel for processing an image representative video signal having periodically recurring image intervals, and blanking intervals disposed between adjacent image intervals and containing a blanking level determinative of image brightness; a source of brightness reference voltage; a kinescope for reproducing images in response to video signals applied thereto; and a gain controllable video signal amplifier included in said video channel; apparatus comprising:

means for comparing said reference voltage and said blanking level to provide an output signal indicative of the difference between said reference voltage and said blanking level;

means for filtering said output signal of said comparing means;

means for coupling said filtered output signal to said video channel for varying said blanking level in a direction to reduce the magnitude of said difference;

control means for deriving an output control signal representative of excessive current demand of said kinescope;

first means for coupling said derived control signal to a first point in said amplifier for varying the gain thereof and thereby the peak amplitude of said video signal in a direction to limit said kinescope current demand; and second means for coupling transient variations of said derived control signal to a second point in said amplifier for opposing transient variations of the D.C. output level of said amplifier otherwise produced as the gain of said amplifier is varied in response to transient variations of said derived control signal.

2. Apparatus according to claim 1, wherein:

the response time of said comparing means including said filtering means for reducing the magnitude of said difference to a minimum is slow relative to said transient variations of said D.C. output level.

3. Apparatus according to claim 2, wherein:

said comparing means including said filtering means are arranged in a sample and hold configuration in a closed control loop with said video channel.

4. Apparatus according to claim 2, and further comprising:

power supply means for providing a plurality of output operating supplies for said video signal processing system; and means coupled to an output of said power supply means for supplying a high operating voltage to said kinescope and operating current in accordance with said kinescope current demand; and wherein said power supply means is susceptible to disrupted operation in the presence of excessive kinescope current demand including current demand attributable to said transient D.C. level variations.

5. Apparatus according to claim 1, wherein:

said filtering means comprises a capacitance; and said second coupling means includes said capacitance, said capacitance being coupled between said output of said control means and said second point in said amplifier such that said capacitance couples derived transient control signals from said control means to said second point for opposing said transient D.C. level variations at said amplifier output.

6. Apparatus according to claim 5, wherein:

said amplifier comprises a transistor having an input electrode to which said video signal is supplied, and an output electrode;

a source of operating currents is coupled to said transistor;

a load impedance is coupled to said output electrode;

said output of said control means is coupled to said source of operating currents for controlling the magnitude of said operating currents, and thereby the signal gain of said transistor and the peak amplitude of said video signal, in accordance with the magnitude of said derived control voltage; and said capacitance is coupled at one end to said output of said control means, and at another end to said load impedance, for coupling derived transient control signals from said control means to said transistor output via said load impedance with a sense to oppose said transient D.C. level variations at said transistor output.

* * * * *